No. 739,188. PATENTED SEPT. 15, 1903.
A. B. KERN.
VEHICLE WHEEL.
APPLICATION FILED MAY 13, 1903.
NO MODEL.
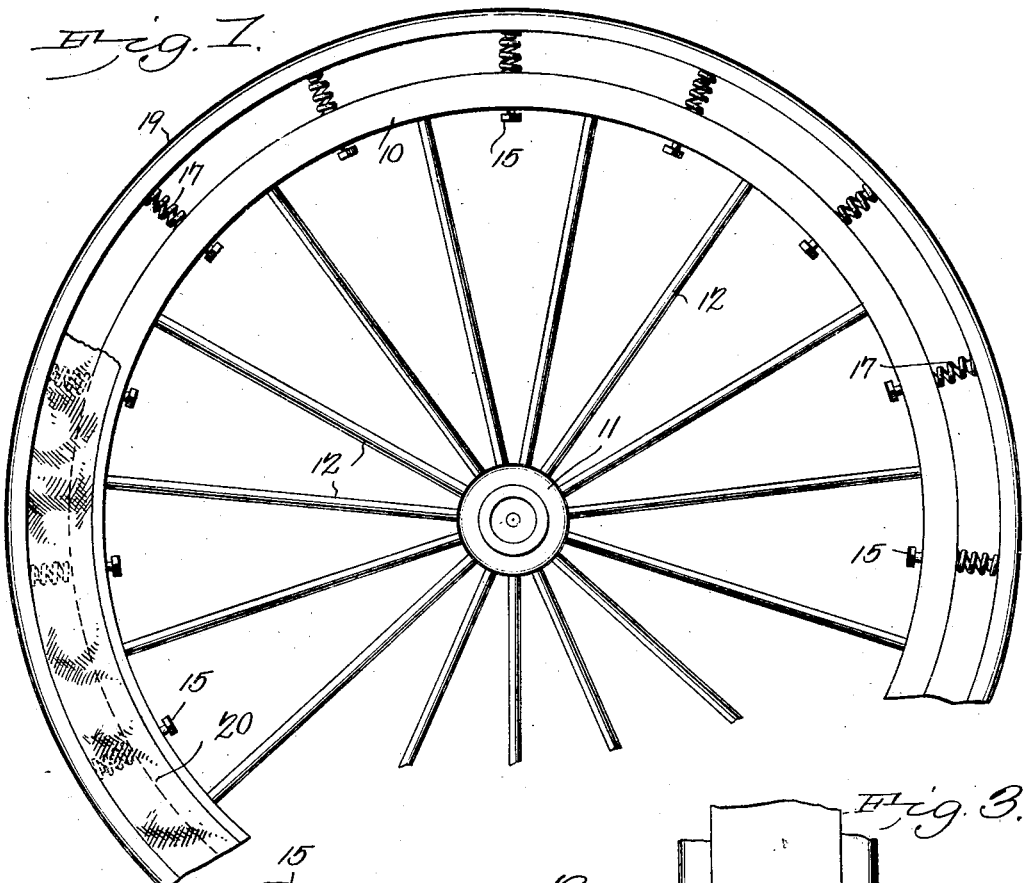
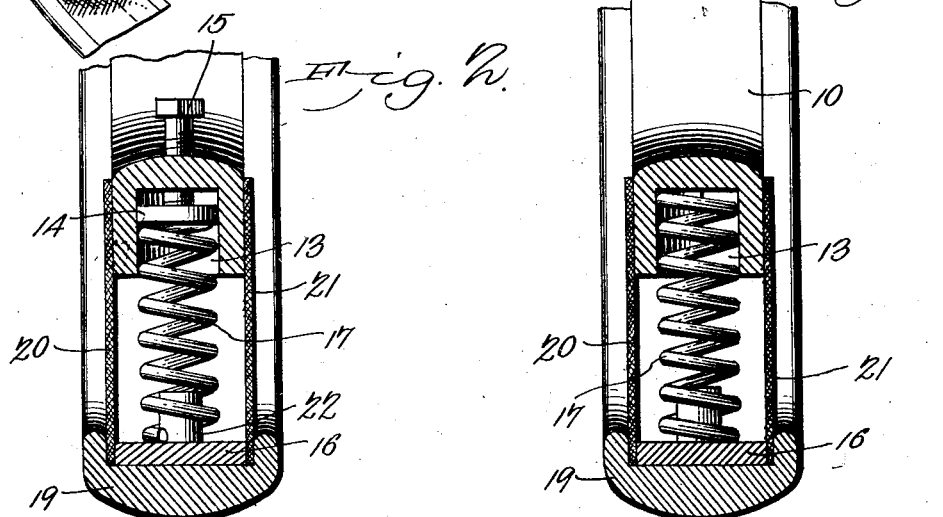
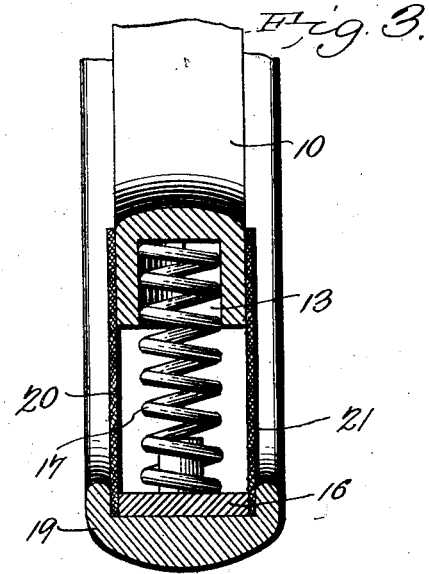
Witnesses
E. F. Stewart
C. N. Woodward
A. B. Kern, Inventor.
by C. A. Snow & Co.
Attorneys No. 739,188. Patented September 15, 1903.

UNITED STATES PATENT OFFICE.

ALFRED B. KERN, OF JACKSON, MICHIGAN.

VEHICLE-WHEEL.

SPECIFICATION forming part of Letters Patent No. 739,188, dated September 15, 1903.

Application filed May 13, 1903. Serial No. 156,990. (No model.)

*To all whom it may concern:*

Be it known that I, ALFRED B. KERN, a citizen of the United States, residing at Jackson, in the county of Jackson and State of Michigan, have invented a new and useful Vehicle-Wheel, of which the following is a specification.

This invention relates to vehicle-wheels of the class having yieldable rims and employed more particularly upon automobiles and similar vehicles and on bicycles and the like, and has for its object to simplify and improve devices of this character and to produce a wheel which will effectually resist deflection under the normal load, but which will yield in event of the wheel meeting obstructions or when subjected to jars and concussions and absorb and distribute the abnormal vibrations thereby produced and prevent their transmission to the vehicle-body.

The invention consists, primarily, in a wheel formed with an inner rim, an outer rim spaced from the inner rim, and spaced springs interposed between the rims and subjected before insertion to compression sufficient to cause them to resist deflection under normal load.

The invention further consists in a wheel formed with an inner rim, an outer rim spaced from said inner rim, springs interposed between said rims, and flexible cover members between said rims and covering for protecting said springs.

Other novel features of the invention will appear in the annexed description and be pointed out in the claim following.

In the drawings illustrative of the invention, in which corresponding parts are denoted by like designating characters, Figure 1 is a side elevation of a portion of one of the improved wheels with the side covering partly removed to show the interior of the rim construction. Fig. 2 is an enlarged sectional detail illustrating the construction more fully. Fig. 3 is an enlarged sectional detail illustrating a modification in the construction.

The improved wheel may be employed upon any of the various makes of automobiles and similar vehicles and the various makes of bicycles and comprises an inner rim 10, connected to the hub 11 by spokes 12, the rim, spokes, and hub being of any approved form and of any suitable material, and I do not, therefore, wish to be limited to any specific form of hub and spokes or to any specific form of inner rim, so long as it is capable of containing a plurality of spaced apertures 13, as shown.

The rim 10 may be of wood or metal or any suitable material, provided with a plurality of spaced cavities 13, each cavity having a follower 14 placed therein, and opposite each follower the rim 12 is provided with a set-screw 15, operating against the follower and adapted to forcibly adjust it in its cavity, as will be obvious.

Encircling the inner rim and spaced therefrom is an outer rim 16, preferably in the form of a steel band, and between the outer rim and the follower-plates are strongly-compressed springs 17, of relatively large gage of wire, as indicated.

The springs being of relatively large gage will when strongly compressed offer a correspondingly strong resistance to deflection and will therefore sustain the normal load of the vehicle without deflection. By this means the vehicle will move under ordinary conditions without affecting the springs; but in event of obstructions being encountered the springs will yield and absorb the jars incident to such concussions and prevent their communication to the vehicle-body or the rider if the wheel is employed upon a bicycle or similar vehicle. Any suitable means may be employed for compressing the springs before being inserted between the spaced rims; but as this forms no part of the present invention it is not illustrated. By this means a relatively rigid yieldable wheel is produced which will be sustained against deflection from the ordinary movements of the vehicle and will therefore entirely obviate the unpleasant tendency to trembling and vibrations common to many forms of yieldable tires, including pneumatic tires, while at the same time it will be sufficiently yieldable to prevent jarring or concussions, as above noted. The adjustable follower-plates provide for "taking up" any loss of elasticity of the individual springs and enables them to be easily maintained at proper tension.

The outer rim 16 will be covered with a rubber or other similar protecting-tire 19 to prevent slipping as well as to protect the comparatively thin band 16 from contact with stones and other hard substances.

Between the rims 10 and 16 are disposed flexible protecting-strips 20 21, which not only cover and protect the springs from dust and moisture, but likewise hide the springs from view and cause the wheel to present a neat and "finished" appearance.

The form of structure shown in Figs. 1, 2, and 3 will be employed more particularly upon automobiles and similar vehicles; but when employed upon bicycles and the like the set-screws 15 and follower-plates 14 may be dispensed with, as they are not required in such vehicles and add somewhat to the weight. When employed upon bicycles and similar vehicles, also the inner ends of the springs may be held in place by studs 22 extending from the rim 16, as shown.

The improved wheel may be of any size and adapted to any size or weight of vehicle.

Having thus described the invention, what I claim is—

A vehicle-wheel comprising an inner rim having spaced cavities in the periphery thereof, set-screws tapped through said rim and projecting into said cavities, follower-plates disposed in said cavities in front of said set-screws, an outer rim having spaced studs on the inner face of its periphery, and spiral springs arranged between said rims with one end engaging said studs and the other end disposed within said cavities and engaged by said follower-plates.

In testimony that I claim the foregoing as my own I have hereto affixed my signature in the presence of two witnesses.

ALFRED B. KERN.

Witnesses:
M. L. PEREGO,
E. L. PEREGO.